(12) United States Patent
Tsukamoto et al.

(10) Patent No.: US 11,467,106 B2
(45) Date of Patent: Oct. 11, 2022

(54) X-RAY ANALYZER

(71) Applicant: JEOL Ltd., Tokyo (JP)

(72) Inventors: Kazunori Tsukamoto, Tokyo (JP); Masahiro Asai, Tokyo (JP); Shigeru Honda, Tokyo (JP)

(73) Assignee: JEOL Ltd., Tokyo (JP)

( * ) Notice: Subject to any disclaimer, the term of this patent is extended or adjusted under 35 U.S.C. 154(b) by 294 days.

(21) Appl. No.: 16/885,916

(22) Filed: May 28, 2020

(65) Prior Publication Data

US 2020/0378909 A1 Dec. 3, 2020

(30) Foreign Application Priority Data

May 31, 2019 (JP) .............................. JP2019-102483

(51) Int. Cl.
  *G01N 23/207* (2018.01)
  *G01N 23/2209* (2018.01)
  *G01N 23/2252* (2018.01)

(52) U.S. Cl.
  CPC ..... *G01N 23/2252* (2013.01); *G01N 23/2076* (2013.01); *G01N 23/2209* (2018.02); *G01N 2223/079* (2013.01); *G01N 2223/303* (2013.01); *G01N 2223/418* (2013.01)

(58) Field of Classification Search
  None
  See application file for complete search history.

(56) References Cited

U.S. PATENT DOCUMENTS

| | | | |
|---|---|---|---|
| 9,927,358 B2 * | 3/2018 | Ostermeyer | G01N 21/274 |
| 11,137,360 B2 * | 10/2021 | Sato | G01N 23/2076 |
| 2016/0320297 A1 * | 11/2016 | Ostermeyer | G01N 21/274 |
| 2020/0225173 A1 | 7/2020 | Sato et al. | |
| 2020/0378909 A1 * | 12/2020 | Tsukamoto | G01N 23/2076 |

FOREIGN PATENT DOCUMENTS

| | | | | |
|---|---|---|---|---|
| JP | 2005043153 A | * | 2/2005 | ............... G01J 3/10 |
| JP | 2005127943 A | * | 5/2005 | ............... G01J 3/12 |
| JP | 3925301 B2 | * | 6/2007 | ............ G01J 3/0254 |
| JP | 2010160094 A | | 7/2010 | |
| WO | 2019064868 A1 | | 4/2019 | |

OTHER PUBLICATIONS

Extended European Search Report issued in EP20176853.8 dated Nov. 16, 2020.

* cited by examiner

*Primary Examiner* — Thomas R Artman

(74) *Attorney, Agent, or Firm* — The Webb Law Firm

(57) ABSTRACT

An X-ray analyzer includes: a specimen stage; a spectrometer having a spectroscopic element and an X-ray detector; a temperature measuring unit including at least one of a first temperature sensor for measuring a temperature of the specimen stage and a second temperature sensor for measuring a temperature of the spectrometer; a storage unit which stores calibration data of the spectrometer, and a previous measurement result by the temperature measuring unit at the time of execution of the calibration of the spectrometer; and a notifying unit which acquires a measurement result by the temperature measuring unit, calculates a temperature variation amount of the acquired measurement result with respect to the previous measurement result stored in the storage unit, and notifies that calibration is needed, based on the temperature variation amount.

6 Claims, 11 Drawing Sheets

X-RAY ANALYZER

CROSS-REFERENCE TO RELATED APPLICATION

This application claims priority to Japanese Patent Application No. 2019-102483 filed May 31, 2019, the disclosure of which is hereby incorporated by reference in its entirety.

BACKGROUND OF THE INVENTION

Field of the Invention

The present invention relates to an X-ray analyzer.

Description of Related Art

An electron probe micro analyzer (EPMA) which irradiates a specimen surface with an electron beam and analyzes the specimen by dispersing and analyzing a characteristic X-ray emitted from the specimen is known (for example, refer to JP-A-2010-160094).

Generally, an electron probe micro analyzer is mounted with a wavelength-dispersive X-ray spectrometer (WDS). In the wavelength-dispersive X-ray spectrometer, X-rays emitted from the specimen is dispersed by an analyzing crystal. The dispersed X-rays are analyzed by an X-ray detector.

In the wavelength-dispersive X-ray spectrometer, a generation source of characteristic X-rays on the specimen, a spectroscopic element, and the X-ray detector move on a Rowland circle. In addition, the spectroscopic element moves on a straight line while maintaining a constant take-off angle. In this case, since a Bragg angle changes with the movement of the spectroscopic element, a wavelength of detected X-rays changes.

Therefore, by considering a distance between the generation source of X-rays and the spectroscopic element as a spectroscopic position and measuring X-rays with the X-ray detector while sweeping the spectroscopic position, an X-ray spectrum of which an abscissa is represented by a wavelength (or a spectroscopic position or the like) and an ordinate is represented by X-ray intensity can be obtained.

In the wavelength-dispersive X-ray spectrometer, a calibration (a calibration by a spectrometer) of the spectroscopic position and the wavelength is performed. For example, a specimen for calibration is used with respect to X-rays with a known wavelength to sweep a spectroscopic position and acquire a waveform of the X-rays and to specify a peak position thereof. This operation is performed with respect to a plurality of X-rays with different wavelengths. In addition, a wavelength that is not actually measured is subjected to an interpolative calculation based on an actually-measured wavelength. In this manner, the spectroscopic position and the wavelength are calibrated.

As described above, a calibration of a range that can be measured by the wavelength-dispersive X-ray spectrometer is performed. Furthermore, when necessary, a peak position may be individually specified and a calibration may be individually performed with respect to X-rays to be measured.

In the wavelength-dispersive X-ray spectrometer, when ambient temperature fluctuates, a change in lattice plane spacing of the spectroscopic element, a deformation of a member supporting the spectroscopic element, a deformation of a specimen stage, and the like may cause a relationship between the spectroscopic position and the wavelength to deviate even though a calibration has been performed. In this case, a problem arises in that, when setting a spectrometer at the spectroscopic position corresponding to the wavelength, a deviation of the spectroscopic position causes X-ray intensity to decline.

In addition, with X-ray analyzers mounted to an EPMA or the like, a quantitative analysis or a map analysis is performed. For example, a quantitative analysis is performed by performing a quantitative correction calculation such as ZAF correction based on a relative ratio of X-ray intensity with respect to a standard specimen of which a concentration of constituent elements is known and obtaining a concentration of constituent elements of an unknown specimen. In addition, a map analysis is performed by scanning electron beams that irradiate a specimen or scanning a specimen stage with a probe and measuring X-ray intensity in synchronization with a scanning signal to acquire a distribution of elements. When performing these analyses, a duration of a single analysis may range from several minutes to several tens of minutes. These analyses are often executed in combination and in a continuous manner, in which case the duration of analysis may be significantly prolonged.

When the duration of analysis is significantly prolonged and apparatus temperature fluctuates due to a fluctuation of room temperature during measurement, in map analysis, a problem arises in that an expansion or contraction of a specimen stage or the like due to a temperature variation causes an image resulting from the map analysis to expand or contract. In addition, even in quantitative analysis, a problem arises in that the temperature variation causes the spectroscopic position to deviate and X-ray intensity to decline.

As described above, an X-ray analyzer provided with a wavelength-dispersive X-ray spectrometer is susceptible to a temperature variation during long-duration analyses.

SUMMARY OF THE INVENTION

According to a first aspect of the invention, there is provided an X-ray analyzer including:

a specimen stage;

a spectrometer having a spectroscopic element which disperses X-rays emitted from a specimen placed on the specimen stage and an X-ray detector which detects X-rays dispersed by the spectroscopic element;

a temperature measuring unit including at least one of a first temperature sensor for measuring a temperature of the specimen stage and a second temperature sensor for measuring a temperature of the spectrometer;

a storage unit which stores calibration data of the spectrometer, and a previous measurement result by the temperature measuring unit at the time of execution of the calibration of the spectrometer; and a notifying unit which acquires a measurement result by the temperature measuring unit, calculates a temperature variation amount of the acquired measurement result with respect to the previous measurement result stored in the storage unit, and notifies that the calibration is needed, based on the temperature variation amount.

According to a second aspect of the invention, there is provided an X-ray analyzer including:

a specimen stage;

a spectrometer having a spectroscopic element which disperses X-rays emitted from a specimen placed on the specimen stage and an X-ray detector which detects X-rays dispersed by the spectroscopic element;

a temperature measuring unit including at least one of a first temperature sensor for measuring a temperature of the specimen stage and a second temperature sensor for measuring a temperature of the spectrometer;

a storage unit which stores calibration data of the spectrometer, and a previous measurement result by the temperature measuring unit at the time of execution of the calibration of the spectrometer; and a control unit which acquires a measurement result by the temperature measuring unit, calculates a temperature variation amount of the acquired measurement result with respect to the previous measurement result stored in the storage unit, and executes calibration based on the temperature variation amount.

According to a third aspect of the invention, there is provided an X-ray analyzer which performs a map analysis by scanning electron beams that irradiate a specimen or by scanning a specimen stage, the X-ray analyzer including:

a specimen stage;

a spectrometer having a spectroscopic element which disperses X-rays emitted from a specimen placed on the specimen stage and an X-ray detector which detects X-rays dispersed by the spectroscopic element;

a temperature measuring unit including at least one of a first temperature sensor for measuring a temperature of the specimen stage and a second temperature sensor for measuring a temperature of the spectrometer;

an analyzing unit which acquires an output signal of the X-ray analyzer and performs the map analysis;

a storage unit which stores calibration data of the spectrometer, and a previous measurement result by the temperature measuring unit at the time of execution of the calibration of the spectrometer; and a notifying unit which notifies that a result of the map analysis is affected by temperature variation, the notifying unit acquiring a measurement result by the temperature measuring unit in a period from start of the map analysis to end of the map analysis and calculates a temperature variation amount of the acquired measurement result with respect to the previous measurement result when calibration has been executed;

the notifying unit determining, based on the temperature variation amount, whether or not a result of the map analysis is affected by temperature variation; and when the notifying unit has determined that a result of the map analysis is affected by temperature variation, the notifying unit causing the storage unit to store information that a result of the map analysis is affected by temperature variation and a result of the map analysis in association, and notifies a result of the map analysis and that a result of the map analysis is affected by temperature variation.

Figure 1:
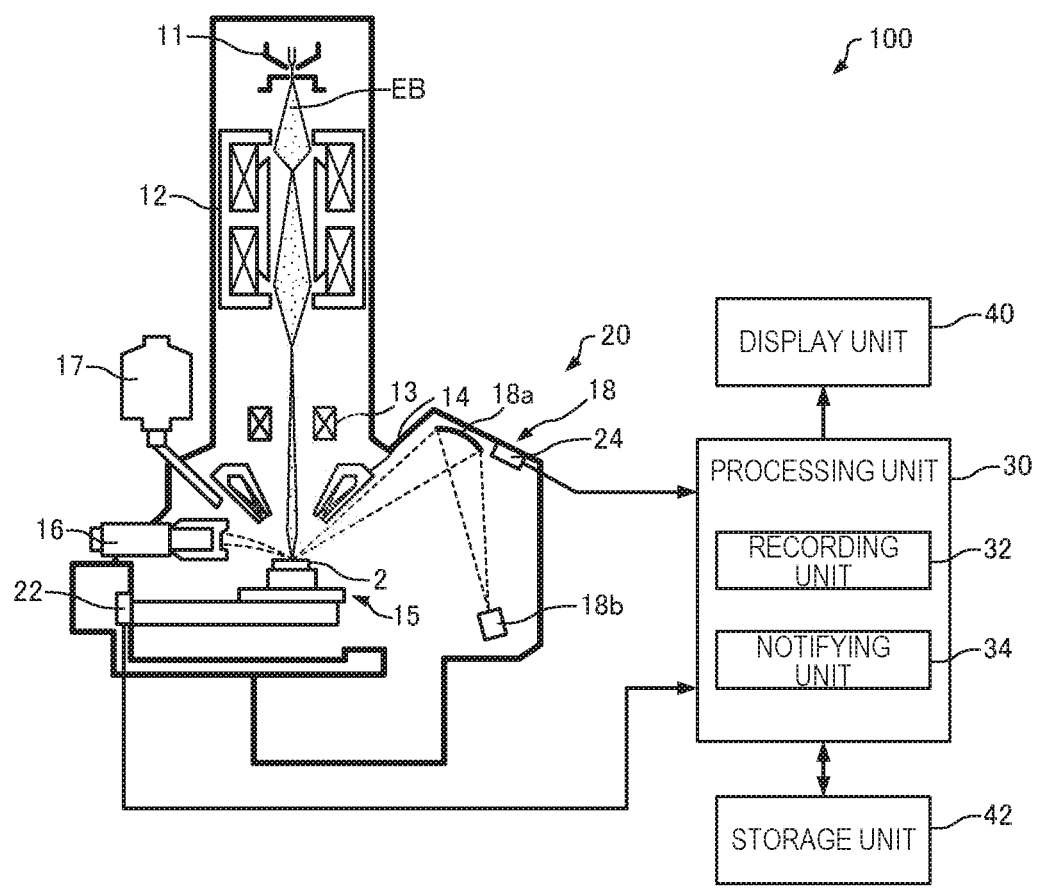
FIG. 1 is a diagram illustrating a configuration of an X-ray analyzer according to the first embodiment.

DESCRIPTION OF THE INVENTION (1) According to an embodiment of the invention, there is provided an X-ray analyzer including:

a specimen stage;

a spectrometer having a spectroscopic element which disperses X-rays emitted from a specimen placed on the specimen stage and an X-ray detector which detects X-rays dispersed by the spectroscopic element;

a temperature measuring unit including at least one of a first temperature sensor for measuring a temperature of the specimen stage and a second temperature sensor for measuring a temperature of the spectrometer;

a storage unit which stores calibration data of the spectrometer, and a previous measurement result by the temperature measuring unit at the time of execution of the calibration of the spectrometer; and a notifying unit which acquires a measurement result by the temperature measuring unit, calculates a temperature variation amount of the acquired measurement result with respect to the previous measurement result stored in the storage unit, and notifies that calibration is needed, based on the temperature variation amount.

According to the X-ray analyzer, the notifying unit acquires a measurement result by the temperature measuring unit, calculates a temperature variation amount of the acquired measurement result with respect to the previous measurement result stored in the storage unit, and notifies that the calibration is needed, based on the temperature variation amount. Therefore, according to the X-ray analyzer, a user can perform a calibration at an appropriate timing.

(2) According to an embodiment of the invention, there is provided an X-ray analyzer including:

a specimen stage;

a spectrometer having a spectroscopic element which disperses X-rays emitted from a specimen placed on the specimen stage and an X-ray detector which detects X-rays dispersed by the spectroscopic element;

a temperature measuring unit including at least one of a first temperature sensor for measuring a temperature of the specimen stage and a second temperature sensor for measuring a temperature of the spectrometer;

a storage unit which stores calibration data of the spectrometer, and a previous measurement result by the temperature measuring unit at the time of execution of the calibration of the spectrometer; and a control unit which acquires a measurement result by the temperature measuring unit, calculates a temperature variation amount of the acquired measurement result with respect to the previous measurement result stored in the storage unit, and executes calibration based on the temperature variation amount.

According to the X-ray analyzer, the control unit acquires a measurement result by the temperature measuring unit, calculates a temperature variation amount of the acquired measurement result with respect to the previous measurement result stored in the storage unit, and executes calibration based on the temperature variation amount. Therefore, according to the X-ray analyzer, a calibration can be performed at an appropriate timing.

(3) According to an embodiment of the invention, there is provided an X-ray analyzer which performs a map analysis by scanning electron beams that irradiate a specimen or by scanning a specimen stage, the X-ray analyzer including:

a specimen stage;

a spectrometer having a spectroscopic element which disperses X-rays emitted from a specimen placed on the specimen stage and an X-ray detector which detects X-rays dispersed by the spectroscopic element;

a temperature measuring unit including at least one of a first temperature sensor for measuring a temperature of the specimen stage and a second temperature sensor for measuring a temperature of the spectrometer;

an analyzing unit which acquires an output signal of the X-ray analyzer and performs the map analysis;

a storage unit which stores calibration data of the spectrometer, and a previous measurement result by the temperature measuring unit at the time of execution of the calibration of the spectrometer; and a notifying unit which notifies that a result of the map analysis is affected by temperature variation, the notifying unit acquiring a measurement result by the temperature measuring unit in a period from start of the map analysis to end of the map analysis and calculates a temperature variation amount of the acquired measurement result with respect to the previous measurement result;

the notifying unit determining, based on the temperature variation amount, whether or not a result of the map analysis is affected by temperature variation; and when the notifying unit has determined that a result of the map analysis is affected by temperature variation, the notifying unit causing the storage unit to store information that a result of the map analysis is affected by temperature variation and a result of the map analysis in association, and notifies a result of the map analysis and that a result of the map analysis is affected by temperature variation.

According to the analyzer, the notifying unit acquires a measurement result by the temperature measuring unit, calculates a temperature variation amount of the acquired measurement result with respect to the previous measurement result stored in the storage unit, and notifies that a result of the map analysis is affected by temperature variation, based on the temperature variation amount. Accordingly, situations where an analysis result that is affected by temperature variation is misinterpreted as a normal analysis result can be eliminated.

Embodiments of the invention are described in detail below with reference to the drawings. It is noted that the following embodiments do not unduly limit the scope of the invention as stated in the claims. In addition, all of the elements described below are not necessarily essential requirements of the invention.

1. First Embodiment 1.1. X-Ray Analyzer

First, an X-ray analyzer according to a first embodiment will be described with reference to the drawings. FIG. 1 is a diagram illustrating a configuration of an X-ray analyzer 100 according to the first embodiment. The X-ray analyzer 100 is an electron probe micro analyzer (EPMA).

The X-ray analyzer 100 includes an electron gun 11, a condenser lens 12, a deflector 13, an objective lens 14, a specimen stage 15, a secondary electron detector 16, an energy-dispersive X-ray detector 17, a wavelength-dispersive X-ray spectrometer 18, a temperature measuring unit 20, a processing unit 30, a display unit 40, and a storage unit 42.

The electron gun 11 generates electron beams EB. The electron gun 11 emits electron beams EB that have been accelerated by applying a predetermined accelerating voltage toward a specimen 2.

The condenser lens 12 is a lens for causing the electron beams EB emitted from the electron gun 11 to converge.

The deflector 13 causes the electron beams EB to be deflected two-dimensionally. By inputting a scan signal to the deflector 13 through a control circuit (not illustrated), the specimen 2 can be scanned with the electron beams EB (an electron probe) that have been focused by the condenser lens 12 and the objective lens 14.

The objective lens 14 is a lens for focusing the electron beams EB on the specimen 2 to irradiate the specimen 2 by the electron beams EB as an electronic probe.

The specimen stage 15 is capable of supporting the specimen 2. The specimen 2 is placed on the specimen stage 15. Although not illustrated, the specimen stage 15 has a moving mechanism for moving the specimen 2. By moving the specimen 2 with the specimen stage 15, an X-ray generation position (a position irradiated by the electron beams EB (the electron probe)) on the specimen 2 can be moved. For example, the specimen stage 15 can be scanned with the electron probe using the moving mechanism.

The secondary electron detector 16 is a detector for detecting secondary electrons emitted from the specimen 2. An output signal of the secondary electron detector 16 is associated with positional information specified by a scanning signal of the electron beams EB and stored in a storage device (not illustrated). Accordingly, a secondary electron image (an SEM image) can be obtained.

The energy-dispersive X-ray detector 17 is a detector for discriminating X-rays according to energy levels to obtain a spectrum. The energy-dispersive X-ray detector 17 detects characteristic X-rays that are generated from the specimen 2 when the specimen 2 is irradiated by the electron beams EB.

The wavelength-dispersive X-ray spectrometer 18 includes a spectroscopic element (an analyzing crystal) 18a and an X-ray detector 18b. In the wavelength-dispersive X-ray spectrometer 18, the X-rays generated from the specimen 2 is dispersed by the spectroscopic element 18a and the dispersed X-rays are analyzed by the X-ray detector 18b.

The spectroscopic element 18a is, for example, a crystal that disperses X-rays using a diffraction phenomenon of the X-rays. The wavelength-dispersive X-ray spectrometer 18 has a plurality of spectroscopic elements 18a with mutually different crystal face intervals. Accordingly, X-rays in a wide wavelength range can be detected.

The X-ray detector 18b has, for example, a proportional counter. The X-ray detector 18b detects characteristic X-rays emitted from the specimen 2 and outputs a signal in which a step height corresponds to an energy level of X-rays.

The output signal of the X-ray detector 18b is converted into a pulse signal by a pulse signal generation circuit. A pulse height of the pulse signal is proportional to the energy level of X-rays. The pulse signal is discriminated according to pulse heights by a pulse-height discriminator. Discriminated pulse signals are counted by a counter circuit. Accordingly, a count rate (the number of pulses per unit time, in units of counts per seconds (cps)) is obtained. By obtaining the count rate of a pulse signal, a count rate of X-rays can be obtained.

The temperature measuring unit 20 includes a first temperature sensor 22 and a second temperature sensor 24. The first temperature sensor 22 and the second temperature sensor 24 are attached to locations that are significantly affected by temperature variation in the X-ray analyzer 100.

The first temperature sensor 22 is a temperature sensor for measuring a temperature of the specimen stage 15. For example, the first temperature sensor 22 is provided on an inner wall of a specimen chamber. The first temperature sensor 22 may be attached to the specimen stage 15 to directly measure the temperature of the specimen stage 15 or may be attached to a member in a vicinity of the specimen stage 15 to indirectly measure the temperature of the specimen stage 15 via the other member.

The second temperature sensor 24 is a temperature sensor for measuring a temperature of the wavelength-dispersive X-ray spectrometer 18. The second temperature sensor 24 is provided on an inner wall of a container which houses the wavelength-dispersive X-ray spectrometer 18. The second temperature sensor 24 may be attached to the spectroscopic element 18a to directly measure the temperature of the spectroscopic element 18a or may be attached to a member in a vicinity of the spectroscopic element 18a to indirectly measure the temperature of the spectroscopic element 18a via the other member.

A measurement result by the temperature measuring unit 20 or, in other words, information on the temperature of the specimen stage 15 as measured by the first temperature sensor 22 and information on the temperature of the wavelength-dispersive X-ray spectrometer 18 as measured by the second temperature sensor 24 are sent to the processing unit 30.

The display unit 40 outputs an image generated by the processing unit 30. The display unit 40 can be realized by a display such as a liquid crystal display (LCD).

The storage unit 42 stores programs and data which enable the processing unit 30 to perform various types of calculation processing and control processing. In addition, the storage unit 42 is also used as a work area of the processing unit 30. The storage unit 42 can be realized by, for example, a random access memory (RAM), a read only memory (ROM), and a hard disk.

The storage unit 42 stores calibration data of the wavelength-dispersive X-ray spectrometer 18 (hereinafter, also simply referred to as "calibration data") and a measurement result of the temperature measuring unit 20 at the time of execution of a calibration of a detection position and a wavelength of X-rays (hereinafter, also simply referred to as "calibration"). A measurement result by the temperature measuring unit 20 at the time of execution of the calibration includes the temperature of the specimen stage 15 at the time of execution of the calibration as measured by the first temperature sensor 22 and the temperature of the wavelength-dispersive X-ray spectrometer 18 at the time of execution of the calibration as measured by the second temperature sensor 24.

The processing unit 30 performs processing for executing a calibration, processing for recording calibration data, processing for notifying that a calibration is needed, and the like. Functions of the processing unit 30 can be realized by having various processors (a central processing unit (CPU) and the like) execute programs stored in the storage unit 42. The processing unit 30 includes a recording unit 32 and a notifying unit 34.

The recording unit 32 performs processing for associating a measurement result by the temperature measuring unit 20 at the time of execution of a calibration of the wavelength-dispersive X-ray spectrometer 18 and calibration data with each other and storing the associated information in the storage unit 42. The recording unit 32 acquires a measurement result by the temperature measuring unit 20 at the time of execution of the calibration or immediately before start of execution of the calibration and stores the measurement result in the storage unit 42 as a measurement result of the temperature measuring unit 20 at the time of execution of the calibration.

Alternatively, the recording unit 32 may constantly record a measurement result by the temperature measuring unit 20. In this case, a time point of execution of a calibration is specified from a time stamp of calibration data or the like and either a measurement result at the time point of the execution of the calibration or a measurement result at a time point that is closest to the time point of the execution of the calibration is acquired. In addition, the recording unit 32 associates the acquired measurement result and the calibration data with each other and stores the associated information in the storage unit 42.

The notifying unit 34 acquires a measurement result by the temperature measuring unit 20 and calculates a temperature variation amount with respect to a measurement result at the time of execution of the calibration that is stored in the storage unit 42. The notifying unit 34 calculates the temperature variation amount by, for example, calculating a difference between a measurement result by the temperature measuring unit 20 (for example, a present measurement result) and a measurement result at the time of execution of the calibration.

The notifying unit 34 notifies, based on the calculated temperature variation amount, that a calibration is needed. The notification that a calibration is needed is issued by, for example, displaying a message that a calibration is needed on the display unit 40. Alternatively, the notification that a calibration is needed may be a notification by sound using a buzzer or the like or a visual notification by lighting a lamp or the like.

Figure 2:
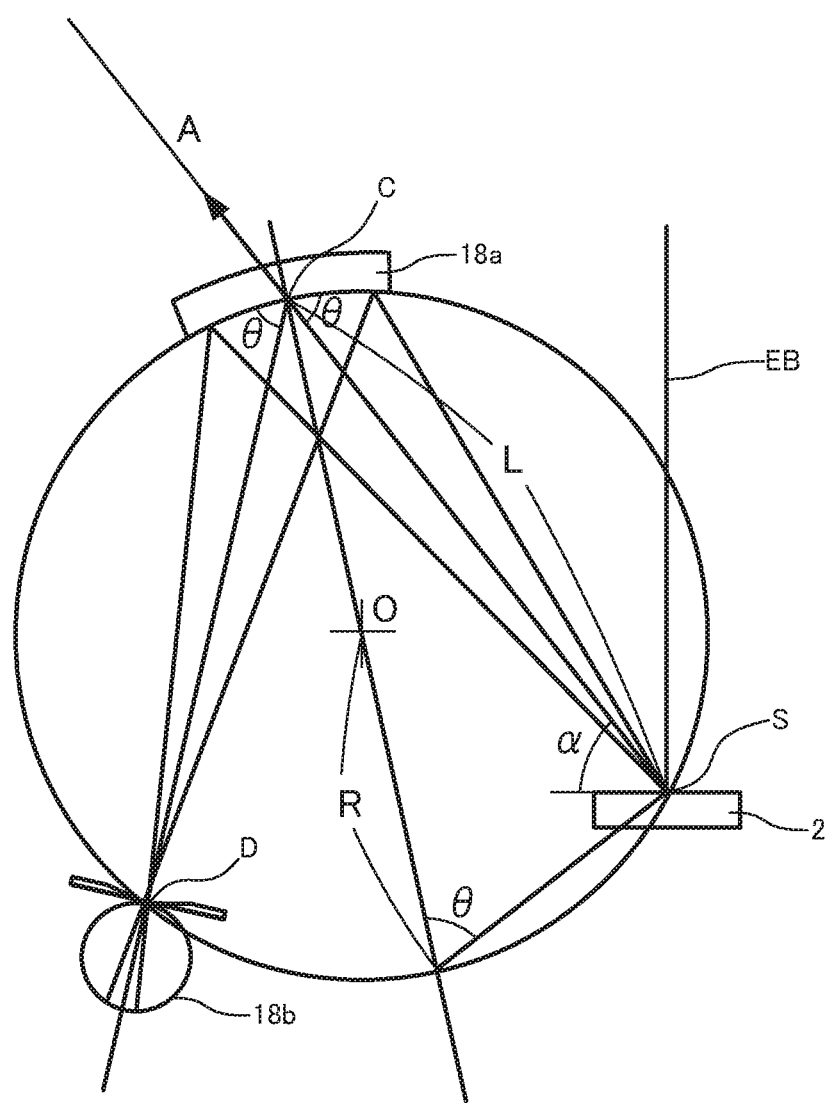
FIG. 2 is a diagram for illustrating a principle of a wavelength-dispersive X-ray spectrometer.

FIG. 2 is a diagram for illustrating a principle of the wavelength-dispersive X-ray spectrometer 18.

In the wavelength-dispersive X-ray spectrometer 18, a center C of the spectroscopic element 18a constituted by a curved X-ray analyzing crystal moves on a straight line A that is inclined by a take-off angle α from an X-ray generation position S. In this case, the X-ray generation position S, the center C of the spectroscopic element 18a, and a center D of a slit of the X-ray detector 18b are always on a Rowland circle with a constant radius R. In addition, a distance SC between the X-ray generation position S and the center C of the spectroscopic element 18a and a distance CD between the center C of the spectroscopic element 18a and the center D of the slit of the X-ray detector 18b are always equal to each other. Furthermore, the spectroscopic element 18a of which a crystal lattice plane is curved by a radius of curvature 2R always faces a center O of the Rowland circle.

When the distance SC is considered a spectroscopic position L and an incidence angle of incident X-rays to the spectroscopic element 18a is denoted by θ, the spectroscopic position L is expressed by the following equation.

$$L = 2R \times \sin\theta \quad (1)$$

On the other hand, when a wavelength of X-rays is denoted by λ and lattice plane spacing of the spectroscopic element 18a is denoted by d, a diffraction condition of the spectroscopic element 18a is expressed by the following equation.

$$2d \times \sin\theta = n \times \lambda \quad (2),$$

where n denotes an order of diffraction that is a positive integer.

From equation (1) and equation (2) above, we get equation (3) below.

$$L = (2R/2d) \times n \times \lambda \quad (3)$$

Equation (3) reveals a relationship between the wavelength λ of X-rays and the spectroscopic position L.

In the wavelength-dispersive X-ray spectrometer 18, by detecting X-rays with the X-ray detector 18b while sweeping the spectroscopic position L and acquiring a count rate of the X-rays, an X-ray spectrum is obtained of which an abscissa is represented by the wavelength λ and an ordinate is represented by X-ray intensity. Alternatively, the abscissa of the X-ray spectrum may represent the spectroscopic position L, an energy value of X-rays that corresponds to the wavelength λ, a sin θ value, a 2θ value, or the like.

Figure 3:
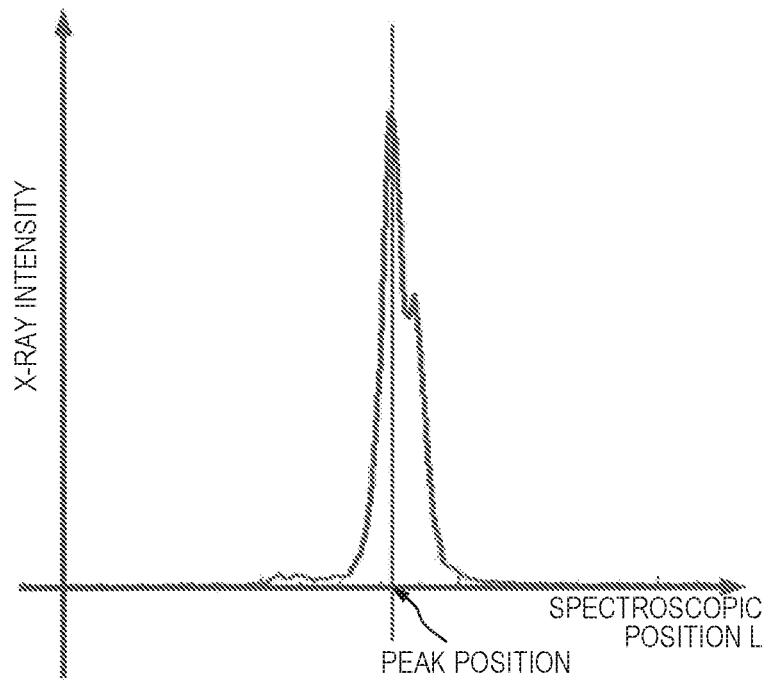
FIG. 3 is a diagram for illustrating a peak search.

FIG. 3 is a diagram for illustrating a peak search.

In the wavelength-dispersive X-ray spectrometer 18, as illustrated in FIG. 3, an intensity waveform of X-rays can be acquired by sweeping the spectroscopic position L and a peak position can be detected. This is referred to as a peak search. The peak position is a position of a peak of the intensity waveform of X-rays and is represented by a coordinate of an abscissa of the X-ray spectrum.

Figure 4:
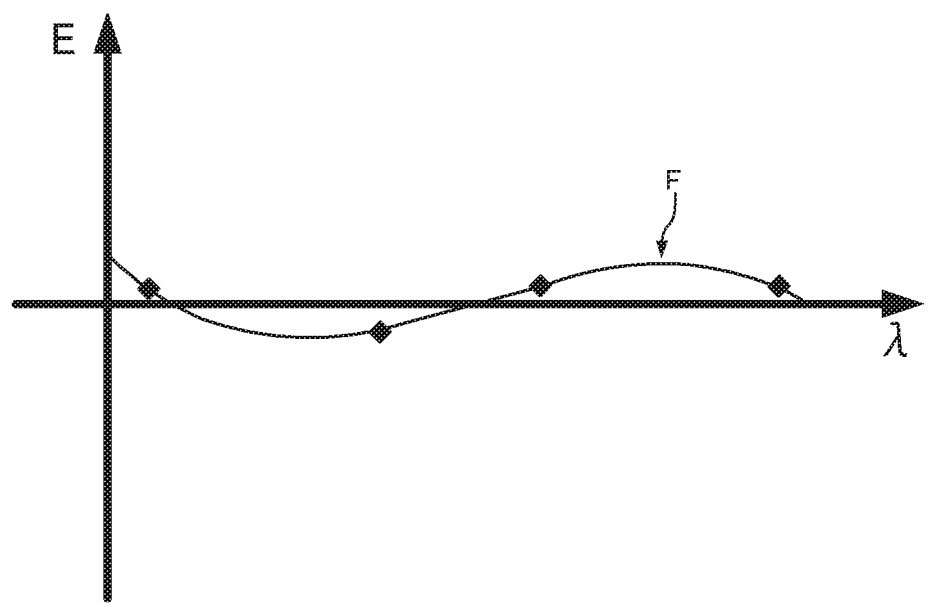
FIG. 4 is a diagram for illustrating a calibration of a spectroscopic position and a wavelength in the wavelength-dispersive X-ray spectrometer.

FIG. 4 is a diagram for illustrating a calibration (calibration by a spectrometer) of the spectroscopic position L and the wavelength λ in the wavelength-dispersive X-ray spectrometer 18. In the graph illustrated in FIG. 4, an abscissa λ represents a wavelength of X-rays and an ordinate E represents an amount of deviation between an X-ray detection position (a peak position) converted from a theoretical value and an actually measured X-ray detection position (peak position).

A calibration of the spectroscopic position L and the wavelength λ is performed using a specimen for calibration. With the specimen for calibration, the wavelength λ of characteristic X-rays to be emitted is known. In the calibration, a measurement involving performing a peak search with respect to characteristic X-rays having a known wavelength λ to specify a peak position is performed with respect to a plurality of characteristic X-rays with different wavelengths. In addition, a wavelength λ that is not actually measured is subjected to an interpolative calculation based on an actually-measured wavelength λ. Accordingly, a wavelength calibration curve F illustrated in FIG. 4 is obtained. The wavelength calibration curve F as calibration data is obtained in this manner. The wavelength λ can be calibrated using the wavelength calibration curve F.

Although not illustrated, in the X-ray analyzer 100, the specimen for calibration is provided on the specimen stage 15. In the X-ray analyzer 100, a calibration can be automatically executed using the specimen for calibration.

Figure 5:
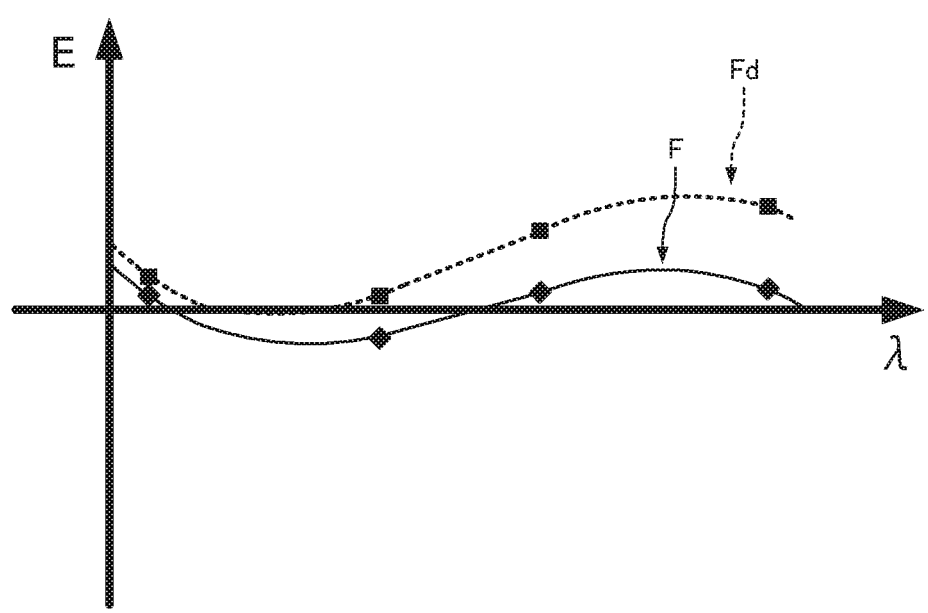
FIG. 5 is a diagram comparing wavelength calibration curves before and after a temperature variation.

FIG. 5 is a diagram comparing wavelength calibration curves before and after a temperature variation. In FIG. 5, the wavelength calibration curve F before the temperature variation is depicted by a solid line and the wavelength calibration curve Fd after the temperature variation is depicted by a dashed line.

As illustrated in FIG. 5, in the wavelength-dispersive X-ray spectrometer 18, when the temperature varies, a relationship between the spectroscopic position L and the wavelength λ may change. This is attributable to a change in lattice plane spacing d of the spectroscopic element 18a due to the temperature variation, a deformation of a member that supports the spectroscopic element 18a due to the temperature variation, a deformation of the specimen stage 15 due to the temperature variation, and the like.

As described earlier, the first temperature sensor 22 and the second temperature sensor 24 are attached to locations that are significantly affected by temperature variation in the X-ray analyzer 100. A temperature variation of the spectroscopic element 18a causes the lattice plane spacing d of the spectroscopic element 18a to change. In addition, when a member that supports the spectroscopic element 18a deforms or the specimen stage 15 deforms due to the temperature variation, the spectroscopic position L and the incidence angle θ change. Therefore, a temperature variation has a significant impact on the specimen stage 15 and the wavelength-dispersive X-ray spectrometer 18.

1.2. Processing

Next, processing performed by the processing unit 30 will be described. Next, processing performed by the recording unit 32 will be described.

The recording unit 32 performs processing for associating a measurement result by the temperature measuring unit 20 at the time of execution of a calibration of the wavelength-dispersive X-ray spectrometer 18 and calibration data with each other and storing the associated information in the storage unit 42.

When a calibration is executed, the recording unit 32 acquires information on a temperature of the specimen stage 15 at the time of execution (or immediately before start of the execution) of the calibration as measured by the first temperature sensor 22 and records the information in the storage unit 42. In a similar manner, the recording unit 32 acquires information on a temperature of the wavelength-dispersive X-ray spectrometer 18 at the time of execution (or immediately before the start of the execution) of the calibration as measured by the second temperature sensor 24 and records the information in the storage unit 42.

When the calibration ends and the wavelength calibration curve F is obtained, the recording unit 32 records the wavelength calibration curve F in the storage unit 42 in association with the temperature of the specimen stage 15 which is recorded in the storage unit 42 and the temperature of the wavelength-dispersive X-ray spectrometer 18 which is recorded in the storage unit 42.

Figure 6:
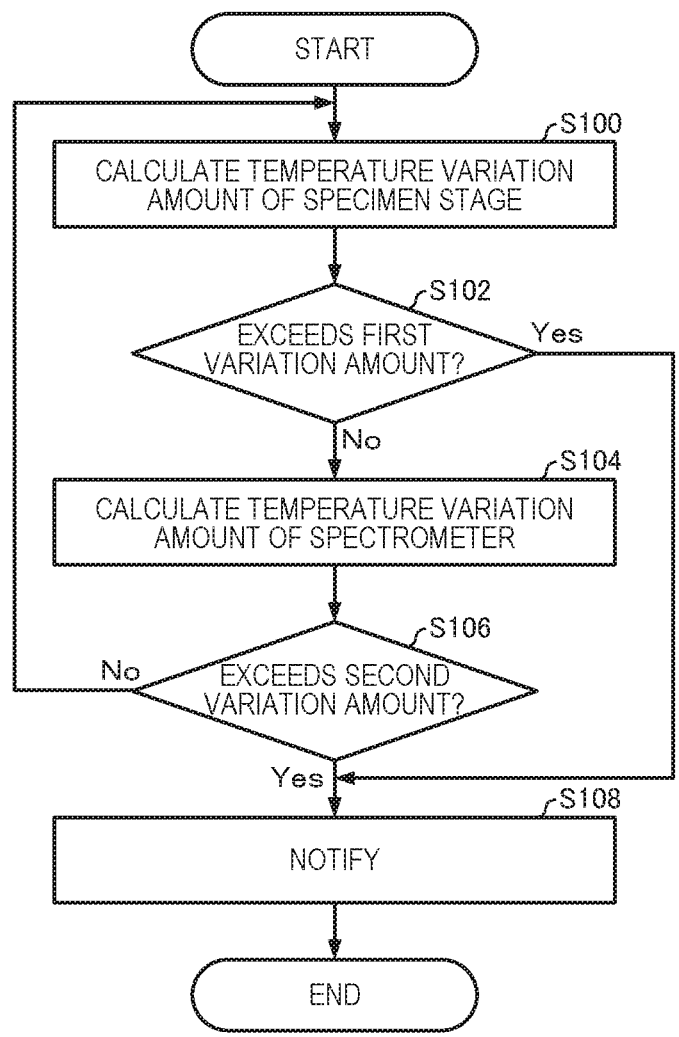
FIG. 6 is a flow chart illustrating an example of processing performed by a notifying unit.

Next, processing performed by the notifying unit 34 will be described. FIG. 6 is a flow chart illustrating an example of processing performed by the notifying unit 34.

The notifying unit 34 acquires information on the temperature of the specimen stage 15 as measured by the first temperature sensor 22 and calculates a temperature variation amount with respect to the temperature of the specimen stage 15 at the time of execution of the calibration as recorded in the storage unit 42 (S100).

For example, the notifying unit 34 calculates the temperature variation amount by calculating a difference between the present temperature of the specimen stage 15 as measured by the first temperature sensor 22 and the temperature of the specimen stage 15 at the time of execution of the calibration as recorded in the storage unit 42.

Next, the notifying unit 34 determines whether or not the calculated temperature variation amount of the specimen stage 15 exceeds a variation amount set in advance (hereinafter, also referred to as a "first variation amount") (S102).

When the notifying unit 34 determines that the temperature variation amount of the specimen stage 15 has not exceeded the first variation amount (No in S102), the notifying unit 34 acquires information on the temperature of the wavelength-dispersive X-ray spectrometer 18 as measured by the second temperature sensor 24 and calculates a temperature variation amount with respect to the temperature of the wavelength-dispersive X-ray spectrometer 18 at the time of execution of the calibration as recorded in the storage unit 42 (S104).

For example, the notifying unit 34 calculates the temperature variation amount by calculating a difference between the present temperature of the wavelength-dispersive X-ray spectrometer 18 as measured by the second temperature sensor 24 and the temperature of the wavelength-dispersive X-ray spectrometer 18 at the time of execution of the calibration as recorded in the storage unit 42.

Next, the notifying unit 34 determines whether or not the calculated temperature variation amount of the wavelength-dispersive X-ray spectrometer 18 exceeds a variation amount set in advance (hereinafter, also referred to as a "second variation amount") (S106). It should be noted that the first variation amount and the second variation amount may be the same or may differ from one another. The first variation amount and the second variation amount can be appropriately set in accordance with an accuracy of wavelengths that is considered necessary for measurement.

When the notifying unit 34 determines that the temperature variation amount of the wavelength-dispersive X-ray spectrometer 18 has not exceeded the second variation amount (No in S106), the notifying unit 34 returns to step S100 and performs processing of step S100, step S102, step S104, and step S106. In this manner, the notifying unit 34 monitors the temperature variation amount of the specimen stage 15 and the temperature variation amount of the wavelength-dispersive X-ray spectrometer 18.

When the notifying unit 34 determines that the temperature variation amount of the specimen stage 15 has exceeded the first variation amount (Yes in S102) or determines that the temperature variation amount of the wavelength-dispersive X-ray spectrometer 18 has exceeded the second variation amount (Yes in S106), the notifying unit 34 notifies a user that a calibration is needed (S108). For example, the notifying unit 34 performs control to cause the display unit 40 to display a message that a calibration is needed. Subsequently, the notifying unit 34 ends the processing.

Although a case where the temperature variation amount of the wavelength-dispersive X-ray spectrometer 18 is calculated after calculating the temperature variation amount of the specimen stage 15 has been described above, an order of these steps is not particularly limited and, alternatively, the temperature variation amount of the specimen stage 15 may be calculated after calculating the temperature variation amount of the wavelength-dispersive X-ray spectrometer 18.

1.3. Features

The X-ray analyzer 100 has, for example, the following features.

In the X-ray analyzer 100, the notifying unit 34 acquires a measurement result by the temperature measuring unit 20, calculates a temperature variation amount with respect to a measurement result at the time of execution of the calibration that is stored in the storage unit 42, and notifies that the calibration is needed, based on the temperature variation amount. Therefore, according to the X-ray analyzer 100, the user can perform a calibration at an appropriate timing. Even with the X-ray analyzer 100 including the wavelength-dispersive X-ray spectrometer 18 which is susceptible to the effect of a temperature variation, measurements can be performed with high accuracy.

In the X-ray analyzer 100, the notifying unit 34 acquires the temperature of the specimen stage 15 as measured by the first temperature sensor 22 and calculates a temperature variation amount with respect to the temperature of the specimen stage 15 at the time of execution of the calibration as stored in the storage unit 42, and notifies that a calibration is needed, when the temperature variation amount exceeds a first variation amount.

In addition, in the X-ray analyzer 100, the notifying unit 34 acquires the temperature of the wavelength-dispersive X-ray spectrometer 18 as measured by the second temperature sensor 24 and calculates a temperature variation amount with respect to the temperature of the wavelength-dispersive X-ray spectrometer 18 at the time of execution of the calibration as stored in the storage unit 42, and notifies that a calibration is needed, when the temperature variation amount exceeds a second variation amount.

In this manner, in the X-ray analyzer 100, temperature variation amounts of the specimen stage 15 and the wavelength-dispersive X-ray spectrometer 18 which are locations susceptible to an effect of a temperature variation are monitored and a notification that a calibration is needed is issued when the temperature variation amounts increase. Therefore, the user can perform a calibration at an appropriate timing.

1.4. Modifications

Next, modifications of the X-ray analyzer 100 will be described. While the temperature measuring unit 20 has the first temperature sensor 22 and the second temperature sensor 24 in the description given above, the temperature measuring unit 20 may only have the first temperature sensor 22. In this case, the notifying unit 34 acquires the temperature of the specimen stage 15 as measured by the first temperature sensor 22, calculates a temperature variation amount with respect to the temperature of the specimen stage 15 at the time of execution of the calibration as stored in the storage unit 42, and notifies that a calibration is needed, when the temperature variation amount exceeds the first variation amount.

Alternatively, the temperature measuring unit 20 may only have the second temperature sensor 24. In this case, the notifying unit 34 acquires the temperature of the wavelength-dispersive X-ray spectrometer 18 as measured by the second temperature sensor 24, calculates a temperature variation amount with respect to the temperature of the wavelength-dispersive X-ray spectrometer 18 at the time of execution of the calibration as stored in the storage unit 42, and notifies that a calibration is needed, when the temperature variation amount exceeds the second variation amount.

2. Second Embodiment 2.1. X-Ray Analyzer

Figure 7:
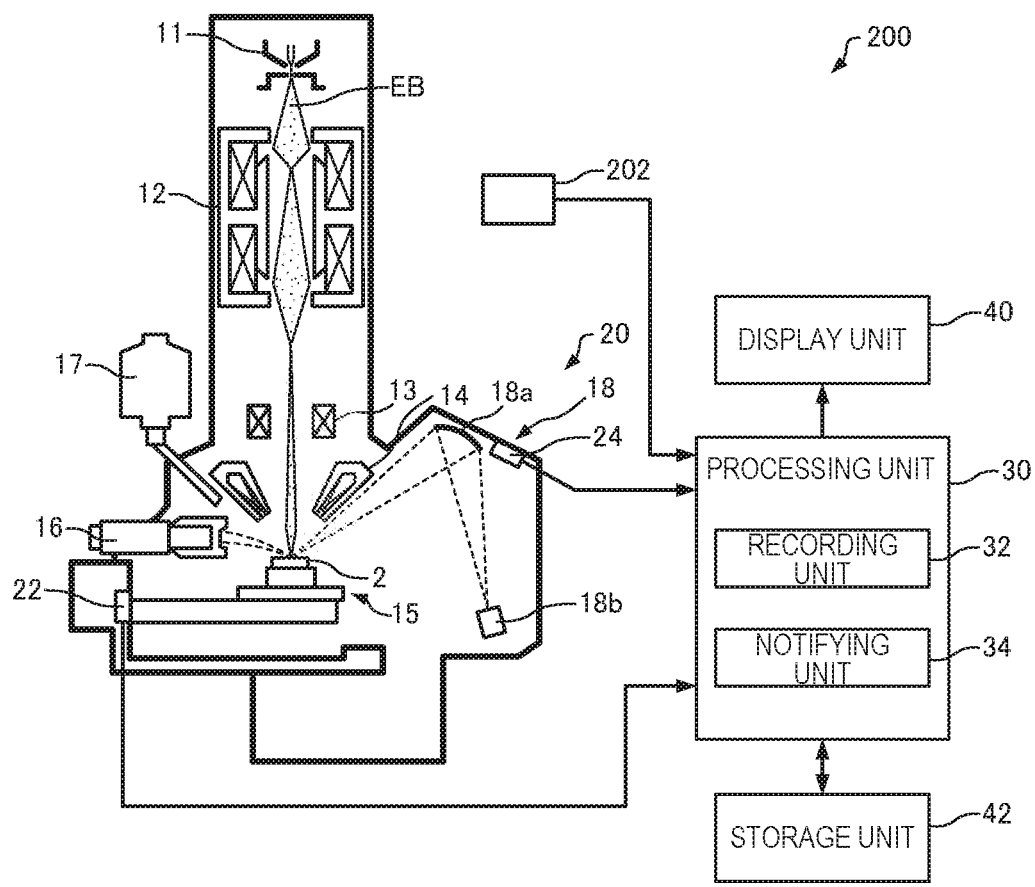
FIG. 7 is a diagram illustrating a configuration of an X-ray analyzer according to the second embodiment.

Next, an X-ray analyzer according to a second embodiment will be described with reference to the drawings. FIG. 7 is a diagram illustrating a configuration of an X-ray analyzer 200 according to the second embodiment. Hereinafter, in the X-ray analyzer 200 according to the second embodiment, members having similar functions to the components of the X-ray analyzer 100 according to the first embodiment will be denoted by same reference characters and a detailed description thereof will be omitted.

As illustrated in FIG. 7, the X-ray analyzer 200 includes a third temperature sensor 202.

The third temperature sensor 202 is a temperature sensor for measuring a temperature of a room where the X-ray analyzer 200 is arranged (hereinafter, also simply referred to as the "room") or, in other words, a room temperature. For example, the third temperature sensor 202 may be attached to a wall of the room or may be attached to a chassis or the like of the X-ray analyzer 200.

The notifying unit 34 acquires a measurement result by the third temperature sensor 202 and calculates a temperature variation amount of the room. When the temperature variation amount of the room exceeds a variation amount set in advance (hereinafter, also referred to as a "third variation amount"), the notifying unit 34 notifies that a calibration is not needed. The third variation amount can be appropriately set in accordance with an accuracy of wavelengths that is considered necessary for measurement.

In this case, when the temperature of the room varies, the temperature of the X-ray analyzer 200 also gradually varies. However, the temperature variation of the X-ray analyzer 200 in this case is more gradual than the temperature variation of the room. For example, when the temperature of the X-ray analyzer 200 reaches a state of equilibrium from one to two hours after the temperature of the room varies, even when a calibration is executed in the X-ray analyzer 200, a deviation is to occur in the relationship between the spectroscopic position L and the wavelength λ from one to two hours after the temperature variation of the room. Therefore, cases where the temperature of the room varies in this manner are not suitable for executing a calibration.

In the X-ray analyzer 200, since a notification that a calibration is not needed is issued when the temperature variation amount of the room exceeds the third variation amount, the user can execute a calibration at an appropriate timing.

2.2. Processing

Figure 8:
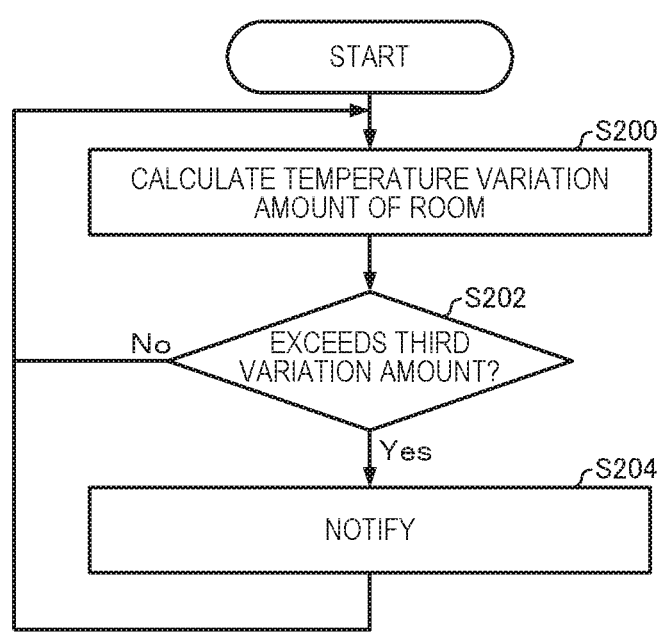
FIG. 8 is a flow chart illustrating an example of processing performed by a notifying unit.

Next, processing performed by the notifying unit 34 will be described. FIG. 8 is a flow chart illustrating an example of processing performed by the notifying unit 34.

The notifying unit 34 acquires information on the temperature of the room as measured by the third temperature sensor 202 and calculates a temperature variation amount of the room (S200). For example, the notifying unit 34 acquires information on the temperature of the room at predetermined time intervals and calculates the temperature variation amount at the predetermined time intervals. The notifying unit 34 may acquire the temperature of the room as measured by the third temperature sensor 202 and calculate a temperature variation amount relative to a reference temperature that is recorded in the storage unit 42. The reference temperature is, for example, an ambient temperature recommended for the X-ray analyzer 200.

Next, the notifying unit 34 determines whether or not the calculated temperature variation amount of the room exceeds the third variation amount set in advance (S202).

When the notifying unit 34 determines that the temperature variation amount of the room has not exceeded the third variation amount (No in S202), the notifying unit 34 returns to step S200 and calculates the temperature variation amount of the room.

When the notifying unit 34 determines that the temperature variation amount of the room has exceeded the third variation amount (Yes in S202), the notifying unit 34 notifies that a calibration is not needed (S204). For example, the notifying unit 34 performs control to cause the display unit 40 to display a message that a calibration is not needed. Subsequently, the notifying unit 34 ends the processing.

3. Third Embodiment 3.1. X-Ray Analyzer

Figure 9:
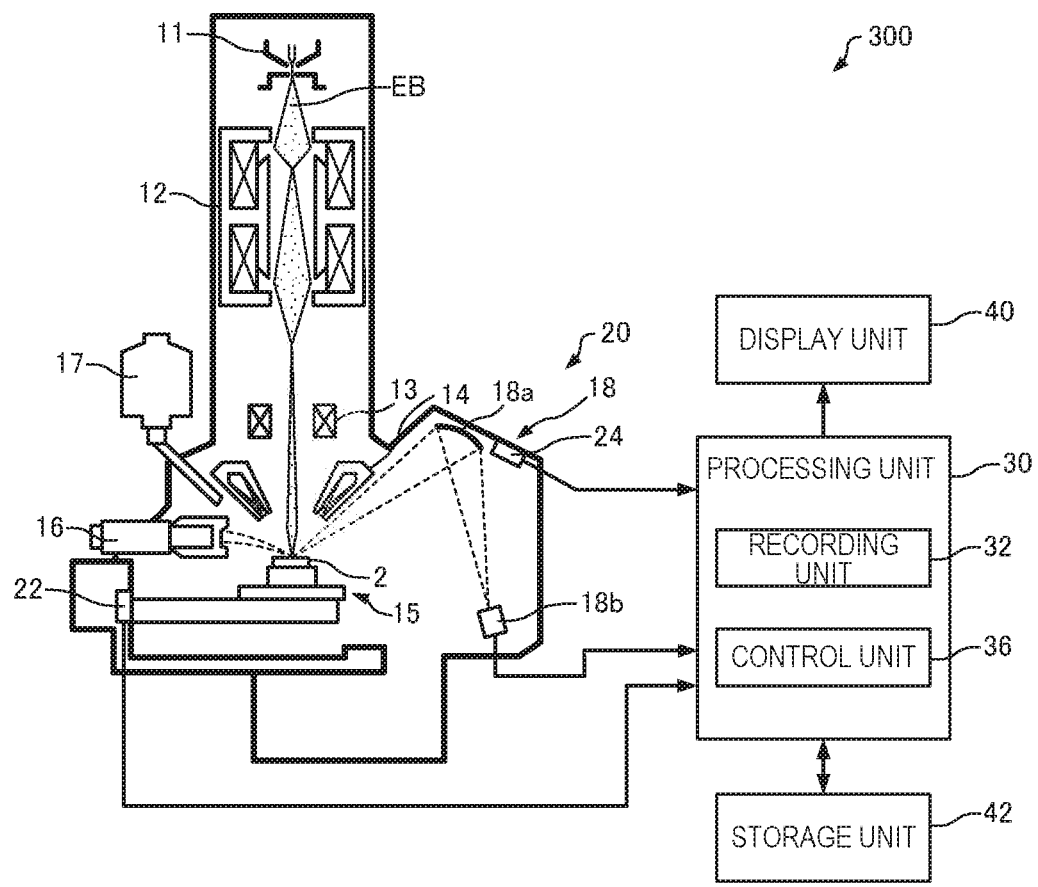
FIG. 9 is a diagram illustrating a configuration of an X-ray analyzer according to the third embodiment.

Next, an X-ray analyzer according to a third embodiment will be described with reference to the drawings. FIG. 9 is a diagram illustrating a configuration of an X-ray analyzer 300 according to the third embodiment. Hereinafter, in the X-ray analyzer 300 according to the third embodiment, members having similar functions to the components of the X-ray analyzer 100 according to the first embodiment will be denoted by same reference characters and a detailed description thereof will be omitted.

In the X-ray analyzer 100 described earlier, the notifying unit 34 acquires a measurement result by the temperature measuring unit 20, calculates a temperature variation amount with respect to a measurement result at the time of execution of the calibration that is stored in the storage unit 42, and notifies that the calibration is needed, based on the temperature variation amount.

In contrast, in the X-ray analyzer 300, the processing unit 30 includes a control unit 36 as illustrated in FIG. 9. The control unit 36 acquires a measurement result by the temperature measuring unit 20, calculates a temperature variation amount with respect to a measurement result at the time of execution of the calibration that is stored in the storage unit 42, and executes the calibration based on the temperature variation amount. Therefore, with the X-ray analyzer 300, a calibration can be executed at an appropriate timing.

3.2. Processing

Figure 10:
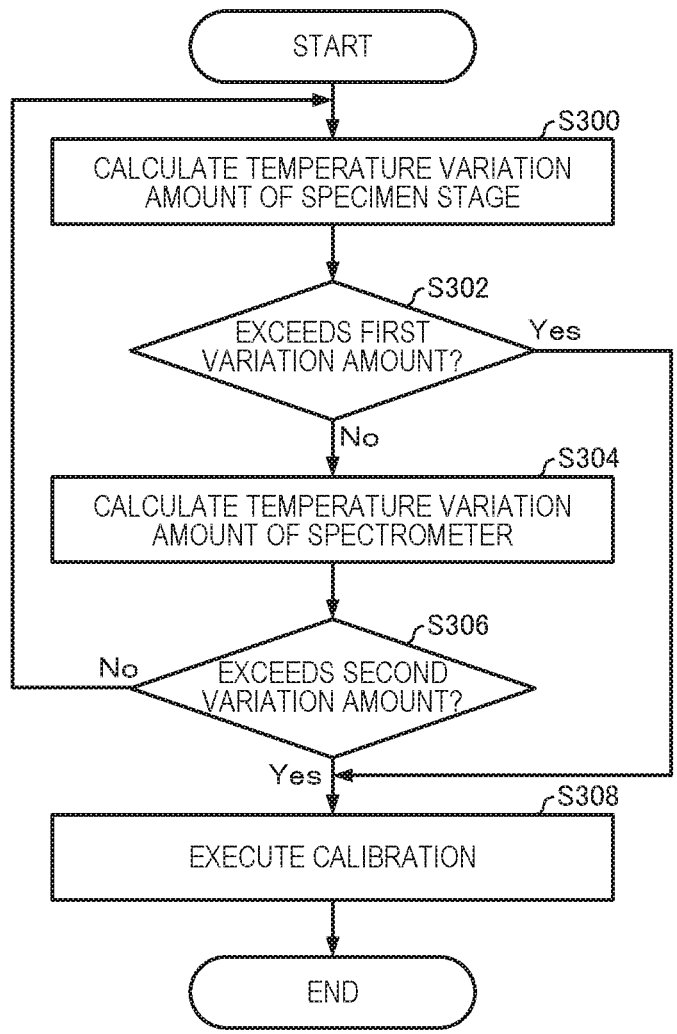
FIG. 10 is a flow chart illustrating an example of processing performed by a control unit.

Next, processing performed by the control unit 36 will be described. FIG. 10 is a flow chart illustrating an example of processing performed by the control unit 36. The following description will focus on points that differ from the example of the notifying unit 34 described above and illustrated in FIG. 6, and description of similar points will be omitted.

The control unit 36 acquires information on the temperature of the specimen stage 15 as measured by the first temperature sensor 22 and calculates a temperature variation amount with respect to the temperature of the specimen stage 15 at the time of execution of the calibration as recorded in the storage unit 42 (S300).

Next, the control unit 36 determines whether or not the calculated temperature variation amount of the specimen stage 15 exceeds the first variation amount (S302).

When the control unit 36 determines that the temperature variation amount of the specimen stage 15 has not exceeded the first variation amount (No in S302), the control unit 36 acquires information on the temperature of the wavelength-dispersive X-ray spectrometer 18 as measured by the second temperature sensor 24 and calculates a temperature variation amount with respect to the temperature of the wavelength-dispersive X-ray spectrometer 18 at the time of execution of the calibration as recorded in the storage unit 42 (S304).

Next, the control unit 36 determines whether or not the calculated temperature variation amount of the wavelength-dispersive X-ray spectrometer 18 exceeds the second variation amount (S306).

When the control unit 36 determines that the temperature variation amount of the wavelength-dispersive X-ray spectrometer 18 has not exceeded the second variation amount (No in S306), the control unit 36 returns to step S300 and performs processing of step S300, step S302, step S304, and step S306. In this manner, the control unit 36 monitors the temperature variation amount of the specimen stage 15 and the temperature variation amount of the wavelength-dispersive X-ray spectrometer 18.

When the control unit 36 determines that the temperature variation amount of the specimen stage 15 has exceeded the first variation amount (Yes in S302) or determines that the temperature variation amount of the wavelength-dispersive X-ray spectrometer 18 has exceeded the second variation amount (Yes in S306), the control unit 36 executes a calibration (S308). The control unit 36 automatically executes the calibration using the specimen for calibration provided on the specimen stage 15. Subsequently, the control unit 36 ends the processing.

The obtained calibration data is associated with the temperature of the specimen stage 15 and the temperature of the wavelength-dispersive X-ray spectrometer 18 at the time of execution of the calibration and recorded in the storage unit 42.

4. Fourth Embodiment

4.1. X-Ray Analyzer

Figure 11:
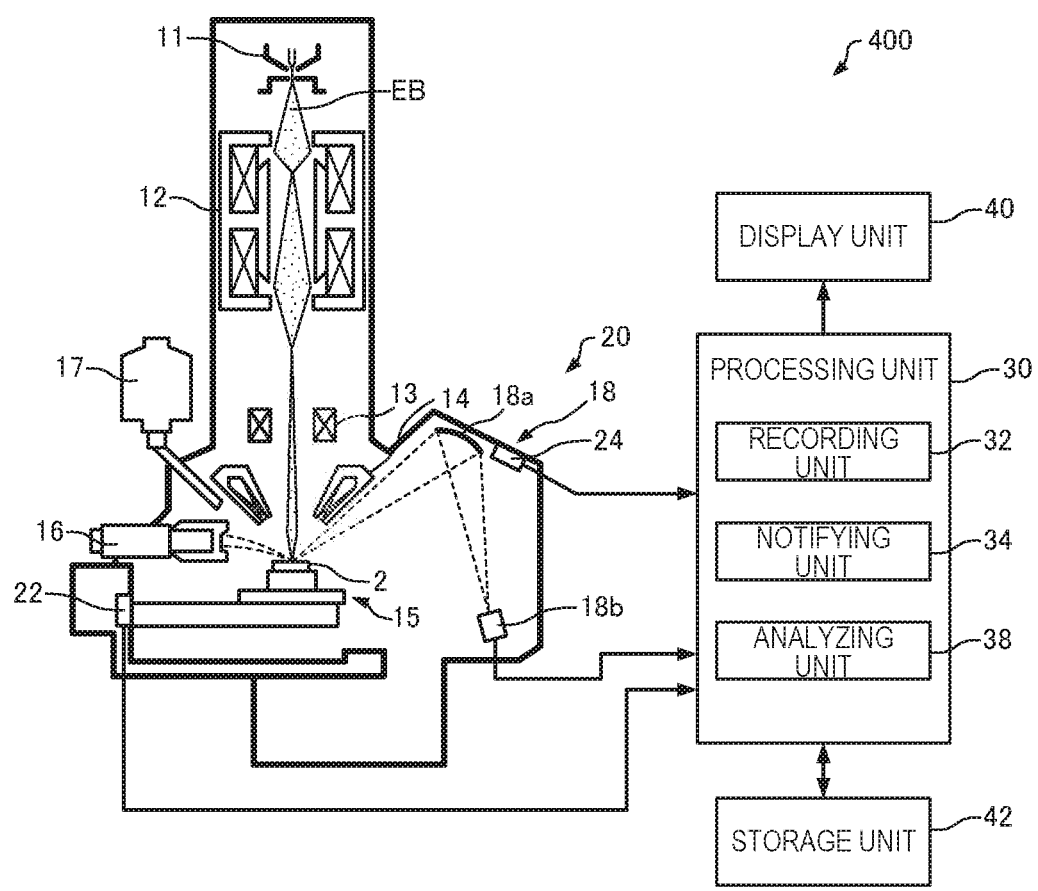
FIG. 11 is a diagram illustrating a configuration of an X-ray analyzer according to the fourth embodiment.

Next, an X-ray analyzer according to a fourth embodiment will be described with reference to the drawings. FIG. 11 is a diagram illustrating a configuration of an X-ray analyzer 400 according to the fourth embodiment. Hereinafter, in the X-ray analyzer 400 according to the fourth embodiment, members having similar functions to the components of the X-ray analyzer 100 according to the first embodiment will be denoted by same reference characters and a detailed description thereof will be omitted.

In the X-ray analyzer 400, the processing unit 30 includes an analyzing unit 38 as illustrated in FIG. 11. The analyzing unit 38 performs a map analysis. A map analysis is a method of visualizing a difference in emission amounts of X-rays from respective points of a specimen to obtain an image indicating a distribution of elements. Hereinafter, an example of an elemental map analysis for acquiring an elemental map representing a distribution of elements using a count rate of specific X-rays as an intensity of each point will be described as the map analysis. It should be noted that the map analysis is not limited thereto and may be a phase map analysis, a quantitative map analysis, or an X-ray map analysis.

The analyzing unit 38 performs the map analysis by, for example, acquiring X-ray intensity information of each point on the specimen 2. X-ray intensity information is, for example, information on a count rate of X-rays with a specific energy level that is obtained by scanning the specimen 2 with the electron beams EB or scanning the specimen stage 15 with a probe and detecting characteristic X-rays emitted from each point of the specimen 2 with the wavelength-dispersive X-ray spectrometer 18.

The notifying unit 34 acquires measurement results by the temperature measuring unit 20 from the start of the map analysis to the end of the map analysis and calculates a temperature variation amount with respect to a measurement result at the time of execution of the calibration which is stored in the storage unit 42. Based on the temperature variation amount, the notifying unit 34 determines whether or not a result of the map analysis is affected by temperature variation. When the notifying unit 34 determines that the result of the map analysis is affected by temperature variation, the notifying unit 34 associates information that the result of the map analysis is affected by temperature variation and the result of the map analysis with each other and causes the storage unit 42 to store the associated information. The notifying unit 34 notifies the result of the map analysis and the fact that the result of the map analysis is affected by temperature variation. Accordingly, situations where an analysis result affected by temperature variation is misinterpreted as a normal analysis result can be eliminated.

The notification that the result of the map analysis is affected by temperature variation is issued by, for example, displaying a message that the result of the map analysis is affected by temperature variation on the display unit 40. The notification that the result of the map analysis is affected by temperature variation is issued at the same time as, for example, the notification of the result of the map analysis. Alternatively, the notification that the result of the map analysis is affected by temperature variation may be a notification by sound using a buzzer or the like or a visual notification by lighting a lamp or the like.

According to the notification, the user can confirm an analysis result and perform a remeasurement as necessary.

4.2. Processing

Figure 12:
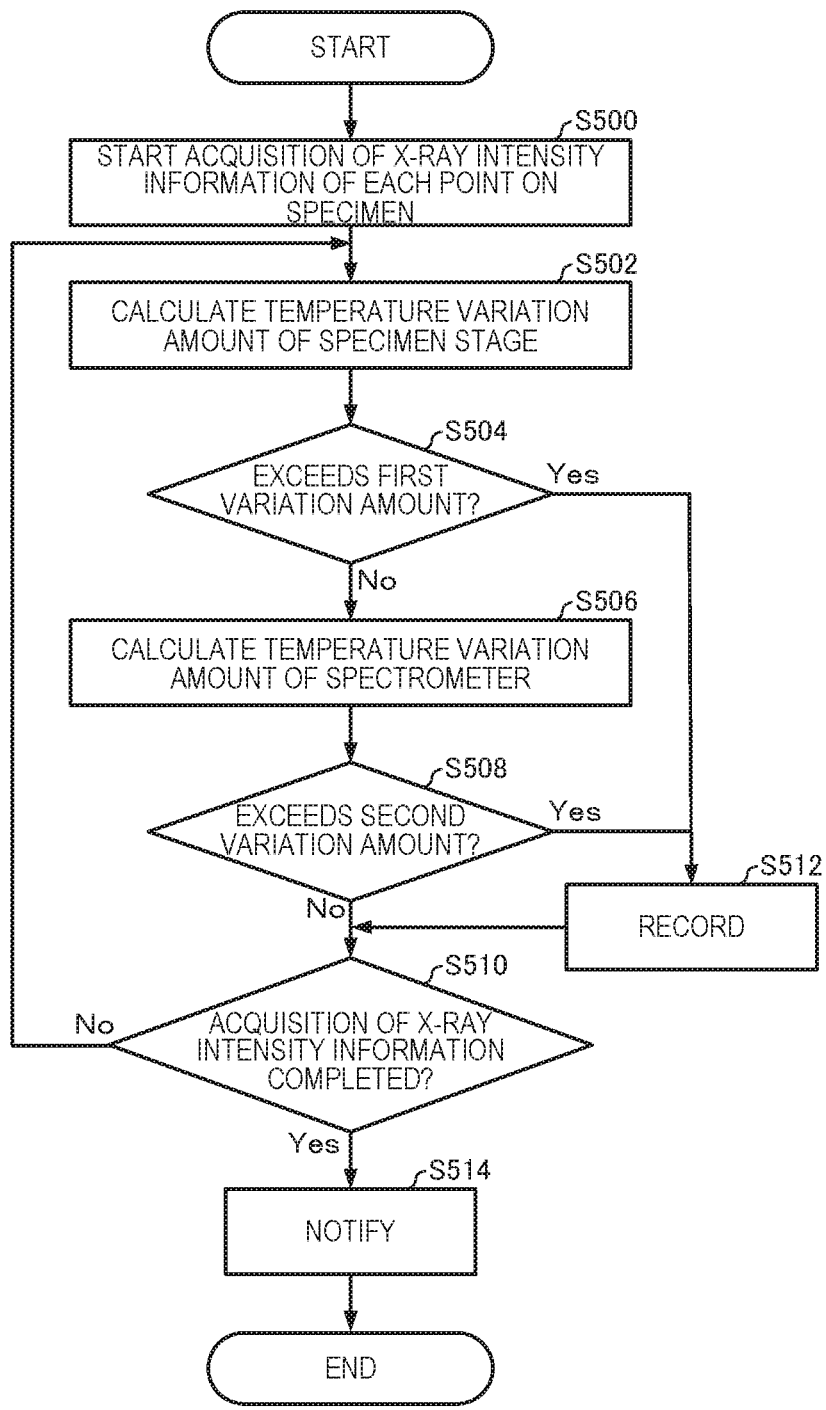
FIG. 12 is a flow chart illustrating an example of processing performed by an analyzing unit.

FIG. 12 is a flow chart illustrating an example of processing performed by the analyzing unit 38. The following description will focus on points that differ from the example of processing performed by the notifying unit 34 described above and illustrated in FIG. 6, and description of similar points will be omitted.

The analyzing unit 38 starts a map analysis upon input of an instruction to start the map analysis. Specifically, the analyzing unit 38 starts acquisition of X-ray intensity information of each point of the specimen 2 (S500).

The notifying unit 34 acquires information on the temperature of the specimen stage 15 as measured by the first temperature sensor 22 and calculates a temperature variation amount with respect to the temperature of the specimen stage 15 at the time of execution of the calibration as recorded in the storage unit 42 (S502).

Next, the notifying unit 34 determines whether or not the calculated temperature variation amount of the specimen stage 15 exceeds the first variation amount (S504). The first variation amount is set to a variation amount at which an effect of the temperature variation of the specimen stage 15 appears in the result of the map analysis. In other words, the processing of step S504 is processing for determining whether or not the result of the map analysis is affected by temperature variation.

When the notifying unit 34 determines that the temperature variation amount of the specimen stage 15 has not exceeded the first variation amount (No in S504), the notifying unit 34 acquires information on the temperature of the wavelength-dispersive X-ray spectrometer 18 as measured by the second temperature sensor 24 and calculates a temperature variation amount with respect to the temperature of the wavelength-dispersive X-ray spectrometer 18 at the time of execution of the calibration as recorded in the storage unit 42 (S506).

Next, the notifying unit 34 determines whether or not the calculated temperature variation amount of the wavelength-dispersive X-ray spectrometer 18 exceeds the second variation amount (S508). The second variation amount is set to a variation amount at which an effect of the temperature variation of the wavelength-dispersive X-ray spectrometer 18 appears in the result of the map analysis. In other words, the processing of step S508 is processing for determining whether or not the result of the map analysis is affected by temperature variation.

When the notifying unit 34 determines that the temperature variation amount of the wavelength-dispersive X-ray spectrometer 18 has not exceeded the second variation amount (No in S508), the analyzing unit 38 determines whether or not the acquisition of X-ray intensity information has been completed at all analysis points on the specimen 2 (S510). In other words, the analyzing unit 38 determines whether or not X-ray intensity information has been obtained with respect to all analysis points on the specimen 2.

When the analyzing unit 38 determines that the acquisition of X-ray intensity information has not been completed (No in S510), a return is made to step S502, in which case the notifying unit 34 performs processing of step S502, step S504, step S506, and step S508 and the analyzing unit 38 performs processing of step S510. In this manner, the notifying unit 34 monitors the temperature variation amount of the specimen stage 15 and the temperature variation amount of the wavelength-dispersive X-ray spectrometer 18 while the map analysis is being performed.

When the notifying unit 34 determines that the temperature variation amount of the specimen stage 15 has exceeded the first variation amount (Yes in S504) or determines that the temperature variation amount of the wavelength-dispersive X-ray spectrometer 18 has exceeded the second variation amount (Yes in S508), the notifying unit 34 causes the storage unit 42 to store information that the result of the map analysis is affected by temperature variation (S512). In addition, the analyzing unit 38 determines whether or not X-ray intensity information has been acquired at all analysis points on the specimen 2 (S510).

When the analyzing unit 38 determines that the acquisition of X-ray intensity information has been completed (Yes in S510), the analyzing unit 38 ends the map analysis.

The notifying unit 34 notifies the result of the map analysis and, when information that the result of the map analysis is affected by temperature variation is stored in the storage unit 42, the notifying unit 34 notifies that the result of the map analysis is affected by temperature variation (S514).

In the processing described above, when the notifying unit 34 determines that the result of the map analysis is affected by temperature variation while the map analysis is in progress, the notifying unit 34 may notify, in real-time, that the result of the map analysis is affected by temperature variation even though the map analysis is in progress.

Figure 13:
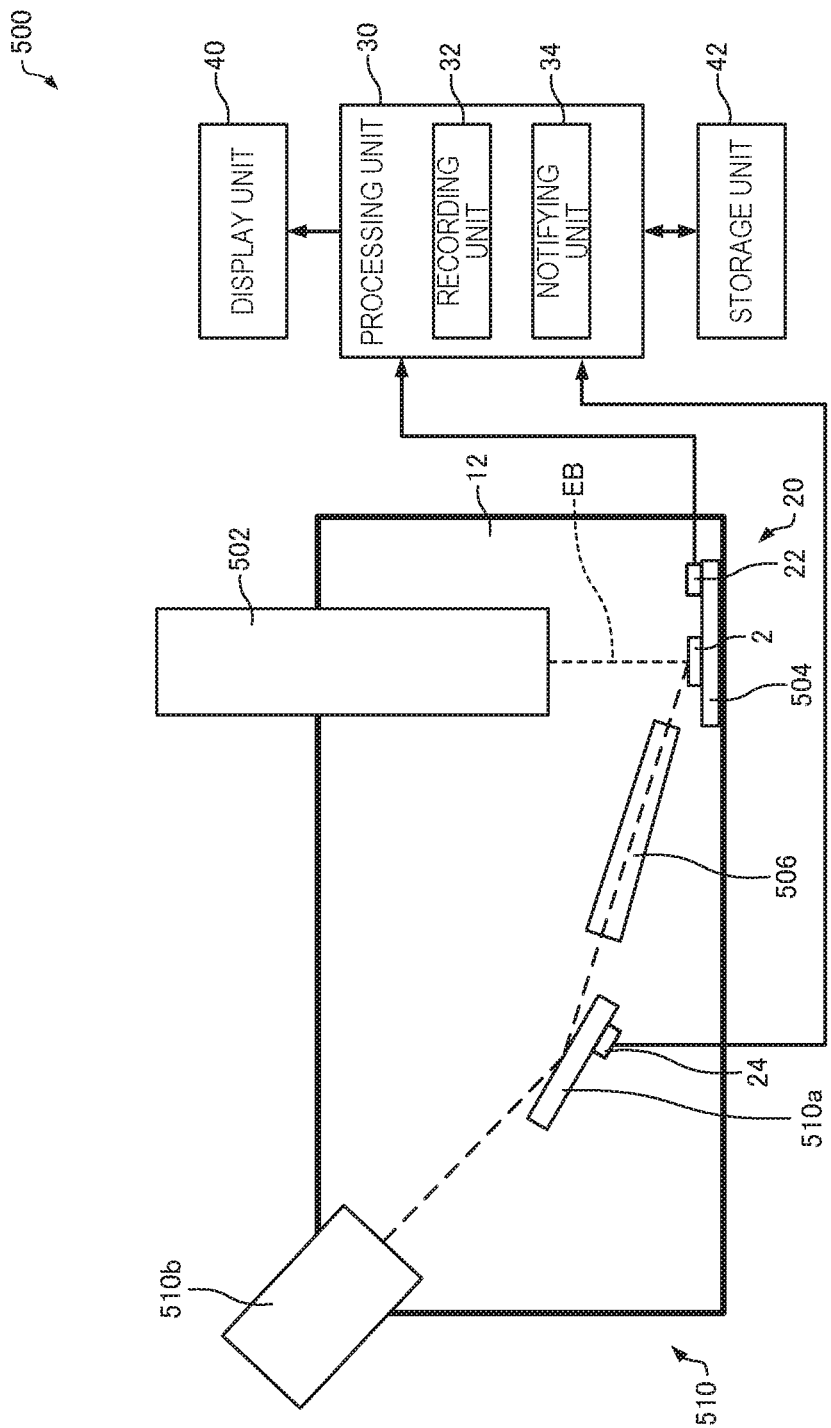
FIG. 13 is a diagram illustrating a configuration of an X-ray analyzer according to the fifth embodiment.

In addition, an order of the respective processing steps illustrated in FIG. 13 can be changed as appropriate. Furthermore, the X-ray analyzer 500 may include the third temperature sensor 202 in a similar manner to the X-ray analyzer 200 described above and illustrated in FIG. 7. In this case, the notifying unit 34 acquires a measurement result by the third temperature sensor 202 and calculates a temperature variation amount of the room, and when the temperature variation amount exceeds the third variation amount, the notifying unit 34 notifies that the result of the map analysis is affected by temperature variation.

5. Fifth Embodiment 5.1. X-Ray Analyzer

Next, an X-ray analyzer according to a fifth embodiment will be described with reference to the drawings. FIG. 13 is a diagram illustrating a configuration of an X-ray analyzer 500 according to the fifth embodiment. Hereinafter, in the X-ray analyzer 500 according to the fifth embodiment, members having similar functions to the components of the X-ray analyzer 100 according to the first embodiment will be denoted by same reference characters and a detailed description thereof will be omitted.

In the first to fourth embodiments described above, the X-ray analyzers include the wavelength-dispersive X-ray spectrometer 18. In contrast, the X-ray analyzer 500 includes a soft X-ray spectrometer 510.

As illustrated in FIG. 13, the X-ray analyzer 500 includes an electron beam irradiating unit 502, a specimen stage 504, an X-ray collecting mirror 506, the soft X-ray spectrometer 510, the temperature measuring unit 20, the processing unit 30, the display unit 40, and the storage unit 42. The soft X-ray spectrometer 510 includes a spectroscopic element 510a and an X-ray detector 510b.

The electron beam irradiating unit 502 irradiates the specimen 2 with electron beams EB. For example, the electron beam irradiating unit 502 includes the electron gun 11, the condenser lens 12, the deflector 13, and the objective lens 14 illustrated in FIG. 1.

The specimen stage 504 supports the specimen 2. The specimen stage 504 shares a same configuration as, for example, the specimen stage 15 illustrated in FIG. 1.

The X-ray collecting mirror 506 collects the characteristic X-rays emitted from the specimen 2 and guides the collected characteristic X-rays to the spectroscopic element 510a. By collecting the characteristic X-rays with the X-ray collecting mirror 506, an intensify of the characteristic X-rays incident to the spectroscopic element 510a can be increased. Accordingly, a reduction in measurement time and an improvement in an S/N ratio of a spectrum can be achieved.

The spectroscopic element 510a receives the characteristic X-rays collected by the X-ray collecting mirror 506 and generates diffracted X-rays of which a diffraction state differs in accordance with energy levels. The spectroscopic element 510a is, for example, a diffraction grating. The spectroscopic element 510a may be an unequally-spaced diffraction grating in which unequally-spaced grooves are formed for the purpose of aberration correction. The spectroscopic element 510a is configured to form a focal point of the diffracted X-rays on a light-receiving surface of the X-ray detector 510b.

The X-ray detector 510b detects diffracted X-rays. The X-ray detector 510b detects the diffracted X-rays using a solid-state imaging element such as a charge coupled device (CCD) image sensor or a complementary MOS (CMOS) image sensor. In the soft X-ray spectrometer 510, X-ray spectra with different energy levels can be measured at the same time without having to move the spectroscopic element 510a and the X-ray detector 510b.

The first temperature sensor 22 is a temperature sensor for measuring a temperature of the specimen stage 504. The second temperature sensor 24 is a temperature sensor for measuring a temperature of the spectroscopic element 510a.

5.2. Processing

In the X-ray analyzer 500, the notifying unit 34 performs processing similar to the processing performed by the notifying unit 34 illustrated in FIG. 6. Therefore, the X-ray analyzer 500 can yield similar advantageous effects to the X-ray analyzer 100.

In addition, the second to fourth embodiments can also be applied to the X-ray analyzer 500.

The above-described embodiments and modifications are examples and the invention is not limited thereto. For example, the embodiments and the modifications may be combined appropriately.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An X-ray analyzer comprising:
   a specimen stage;
   a spectrometer having a spectroscopic element which disperses X-rays emitted from a specimen placed on the specimen stage and an X-ray detector which detects X-rays dispersed by the spectroscopic element;
   a temperature measuring unit including at least one of a first temperature sensor for measuring a temperature of the specimen stage and a second temperature sensor for measuring a temperature of the spectrometer;
   a storage unit which stores calibration data of the spectrometer, and a previous measurement result by the temperature measuring unit at a time of execution of the calibration of the spectrometer; and
   a notifying unit which acquires a measurement result by the temperature measuring unit, calculates a temperature variation amount of the acquired measurement result with respect to the previous measurement result stored in the storage unit, and notifies that calibration is needed, based on the temperature variation amount,
   wherein the notifying unit acquires a temperature of the specimen stage as measured by the first temperature sensor, calculates a temperature variation amount of the acquired temperature with respect to a previous temperature of the specimen stage at the time of execution of the calibration as stored in the storage unit, and notifies that calibration is needed, when the temperature variation amount exceeds a first variation amount.

2. The X-ray analyzer according to claim 1, wherein the notifying unit acquires a temperature of the spectrometer as measured by the second temperature sensor, calculates a temperature variation amount of the acquired temperature with respect to a previous temperature of the spectrometer at the time of execution of the calibration as stored in the storage unit, and notifies that calibration is needed, when the temperature variation amount exceeds a second variation amount.

3. The X-ray analyzer according to claim 1, further comprising:
   a third temperature sensor for measuring a temperature of a room in which the X-ray analyzer is arranged, wherein
   the notifying unit acquires a measurement result by the third temperature sensor and calculates a temperature variation amount of the room, and notifies that calibration is not needed, when the temperature variation amount of the room exceeds a third variation amount.

4. An X-ray analyzer comprising:
   a specimen stage;
   a spectrometer having a spectroscopic element which disperses X-rays emitted from a specimen placed on the specimen stage and an X-ray detector which detects X-rays dispersed by the spectroscopic element;
   a temperature measuring unit including at least one of a first temperature sensor for measuring a temperature of the specimen stage and a second temperature sensor for measuring a temperature of the spectrometer;
   a storage unit which stores calibration data of the spectrometer, and a previous measurement result by the temperature measuring unit at a time of execution of the calibration of the spectrometer; and
   a control unit which acquires a measurement result by the temperature measuring unit, calculates a temperature variation amount of the acquired measurement result with respect to the previous measurement result stored in the storage unit, and executes calibration based on the temperature variation amount,
   wherein the control unit acquires a temperature of the specimen stage as measured by the first temperature sensor, calculates a temperature variation amount of the acquired temperature with respect to a previous temperature of the specimen stage at the time of execution of the calibration as stored in the storage unit, and executes calibration when the temperature variation amount exceeds a first variation amount.

5. The X-ray analyzer according to claim 4, wherein the control unit acquires a temperature of the spectrometer as measured by the second temperature sensor, calculates a temperature variation amount of the acquired temperature with respect to a previous temperature of the spectrometer at the time of execution of the calibration as stored in the storage unit, and executes calibration when the temperature variation amount exceeds a second variation amount.

6. An X-ray analyzer which performs a map analysis by scanning electron beams that irradiate a specimen or by scanning a specimen stage, the X-ray analyzer comprising:
   a specimen stage;
   a spectrometer having a spectroscopic element which disperses X-rays emitted from a specimen placed on the specimen stage and an X-ray detector which detects X-rays dispersed by the spectroscopic element;
   a temperature measuring unit including at least one of a first temperature sensor for measuring a temperature of the specimen stage and a second temperature sensor for measuring a temperature of the spectrometer;
   an analyzing unit which acquires an output signal of the X-ray analyzer and performs the map analysis;
   a storage unit which stores calibration data of the spectrometer, and a previous measurement result by the temperature measuring unit at a time of execution of the calibration of the spectrometer; and
   a notifying unit which notifies that a result of the map analysis is affected by temperature variation,
   the notifying unit acquiring a measurement result by the temperature measuring unit in a period from start of the map analysis to end of the map analysis and calculates a temperature variation amount of the measurement result with respect to the previous measurement result;
   the notifying unit determining, based on the temperature variation amount, whether or not a result of the map analysis is affected by temperature variation; and
   when the notifying unit has determined that a result of the map analysis is affected by temperature variation, the notifying unit causing the storage unit to store information that a result of the map analysis is affected by temperature variation and a result of the map analysis in association, and notifies a result of the map analysis and that a result of the map analysis is affected by temperature variation.

* * * * *